United States Patent
Wang

(10) Patent No.: US 10,650,497 B2
(45) Date of Patent: May 12, 2020

(54) METHOD AND DEVICE FOR TRANSMITTING AND DISPLAYING IMAGE, STORAGE MEDIUM, AND PROCESSOR

(71) Applicant: BEIJING 7INVENSUN TECHNOLOGY CO., LTD., Beijing (CN)

(72) Inventor: Yunfei Wang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/338,441

(22) PCT Filed: Apr. 10, 2018

(86) PCT No.: PCT/CN2018/082442
§ 371 (c)(1),
(2) Date: Mar. 29, 2019

(87) PCT Pub. No.: WO2018/196597
PCT Pub. Date: Nov. 1, 2018

(65) Prior Publication Data
US 2019/0236757 A1    Aug. 1, 2019

(30) Foreign Application Priority Data
Apr. 28, 2017  (CN) .......................... 2017 1 0298955

(51) Int. Cl.
*G06T 3/40*      (2006.01)
*G06T 11/60*     (2006.01)
(Continued)

(52) U.S. Cl.
CPC ............ *G06T 3/4092* (2013.01); *G06F 3/147* (2013.01); *G06F 3/1454* (2013.01); *G06T 7/11* (2017.01);
(Continued)

(58) Field of Classification Search
CPC ..... G06T 3/4092; G06T 19/006; G06F 3/011; G06F 3/013; G09G 2340/0407;
(Continued)

(56) References Cited

U.S. PATENT DOCUMENTS 8,363,953 B2   1/2013  Kameyama
8,532,394 B2   9/2013  Kameyama
(Continued)

FOREIGN PATENT DOCUMENTS

CN     101217643 A    7/2008
CN     101697112 A    4/2010
(Continued)

OTHER PUBLICATIONS

International Search Report (in English and Chinese) and Written Opinion (in Chinese) of the International Searching Authority issued in PCT/CN2018/082442, dated Jun. 27, 2018; ISA/CN.
(Continued)

*Primary Examiner* — Jeffery A Brier
(74) *Attorney, Agent, or Firm* — Harness, Dickey & Pierce, P.L.C.

(57) ABSTRACT

Disclosed are a method and device for transmitting and displaying an image, a storage medium, and a processor. The method includes: segmenting a target image into multiple regions to obtain multiple regional images, where the multiple regions to which the regional images belong include a first region and a second region, the first region is a region on which a gaze point falls, and the second region is a region other than the first region in the target image; assigning resolutions to the respective regional images of the target image, where the respective regional images have different resolutions; and transmitting, one by one, the respective regional images have different resolutions.

20 Claims, 4 Drawing Sheets

(51) Int. Cl.
  *G06T 7/11*   (2017.01)
  *G06F 3/147*  (2006.01)
  *G06F 3/14*   (2006.01)
  *G06T 11/00*  (2006.01)
  *G06T 9/00*   (2006.01)

(52) U.S. Cl.
  CPC ............... *G06T 9/00* (2013.01); *G06T 11/00* (2013.01); *G06T 11/60* (2013.01)

(58) Field of Classification Search
  CPC ... G09G 2340/0414; G09G 2340/0421; H04N 21/4728
  See application file for complete search history.

(56) References Cited

U.S. PATENT DOCUMENTS

| | | |
|---|---|---|
| 2003/0202581 A1 | 10/2003 | Kodama |
| 2004/0175764 A1 | 9/2004 | Nishiyama et al. |
| 2010/0119157 A1 | 5/2010 | Kameyama |
| 2012/0236937 A1 | 9/2012 | Kameyama |
| 2015/0348250 A1 | 12/2015 | Nakai |
| 2016/0219241 A1* | 7/2016 | Korneliussen ....... H04N 7/0127 |
| 2016/0267716 A1* | 9/2016 | Patel ...................... G09G 5/395 |
| 2017/0084083 A1* | 3/2017 | Wilson .................. G06T 19/006 |
| 2017/0316607 A1* | 11/2017 | Khalid .................. G06T 19/006 |
| 2018/0136720 A1* | 5/2018 | Spitzer .................... G06F 3/013 |
| 2018/0137602 A1* | 5/2018 | Spitzer .................... G06F 3/013 |

FOREIGN PATENT DOCUMENTS

| | | | | |
|---|---|---|---|---|
| CN | 102325257 A | | 1/2012 | |
| CN | 102647590 A | | 8/2012 | |
| CN | 104049812 A | * | 9/2014 | ............... G06T 7/13 |
| CN | 105635624 A | * | 6/2016 | ............... G06F 3/01 |
| CN | 105827866 A | * | 8/2016 | |
| CN | 107153519 A | | 9/2017 | |
| CN | 107168668 A | | 9/2017 | |

OTHER PUBLICATIONS

First Chinese Office Action regarding Application No. 201710298955.3 dated Mar. 26, 2019. Translation provided by www.globaldossier.uspto.gov.

* cited by examiner

METHOD AND DEVICE FOR TRANSMITTING AND DISPLAYING IMAGE, STORAGE MEDIUM, AND PROCESSOR

This application is a National application of PCT international patent application PCT/CN2018/082442, filed on Apr. 10, 2018 which claims priority to Chinese Patent Application No. 201710298955.3, titled "METHOD FOR TRANSMITTING AND DISPLAYING IMAGE, AND IMAGE PROCESSING DEVICE", filed on Apr. 28, 2017 with the Chinese Patent Office, both of which are incorporated herein by reference in their entireties.

FIELD

The present disclosure relates to the technical field of image transmission, and in particular to an image transmission method, an image display method, an image transmission device, an image display device, a storage medium and a processor.

BACKGROUND

Currently, when the conventional computer transmits an image to a display device, the image to be transmitted is transmitted with its original size and its original resolution point by point, and the image is not compressed.

The image is not compressed during a process that the conventional computer transmits the image to the display device, and the image with a full resolution is transmitted. Therefore, data amount of the image to be transmitted is large during the image transmission process, resulting in a low speed for transmitting the image.

Presently, no effective technical resolutions are proposed to solve the problems in the related technology of a low image transmission efficiency due to a large data amount during full resolution image transmission.

SUMMARY

There are provided an image transmission method, an image display method, an image transmission device, an image display device, a storage medium and a processor according to embodiments of the present disclosure, so as to solve the technical problems in the related technology of a low image transmission efficiency due to a large data amount during full resolution image transmission.

An image transmission method is provided according to an aspect of an embodiment of the present disclosure. The image transmission method includes: segmenting a target image into multiple regions to obtain multiple regional images, where the multiple regional images include a first regional image in which a gaze point is located, and a second regional image which is an image in the target image other than the first regional image; assigning resolutions to the multiple regional images, where the multiple regional images have different resolutions; and transmitting, one by one, the multiple regional images with different resolutions.

Optionally, the segmenting the target image into multiple regions to obtain multiple regional images includes: segmenting the target image into a first region and a second region to obtain a first regional image and a regional image, where the first region is a region in which the gaze point is located, and the second region is a region in the target image other than the first region.

Optionally, the assigning the resolutions to the multiple regional images includes: assigning a first resolution to the first regional image, where the first resolution is an original resolution of the target image; and assigning a second resolution to the second regional image, where the second resolution is lower than the original resolution of the target image.

Optionally, the assigning the second resolution to the second regional image includes: converting a resolution of the second regional image into the second resolution lower than the original resolution by down-sampling the second regional image.

Optionally, the transmitting, one by one, the multiple regional images with different resolutions includes at least one of: transmitting, one by one, the multiple regional images in a descending order of the resolutions; transmitting, one by one, the multiple regional images in an ascending order of the resolutions; and transmitting, one by one, the multiple regional images in a random order of the resolutions.

An image display method is further provided according to another aspect of the embodiment of the present disclosure. The image display method includes: receiving, one by one, multiple regional images with different resolutions; converting the multiple regional images with different resolutions into multiple display images with same resolutions as a resolution of a display screen; determining, in the display screen, multiple display regions of the multiple display images; stitching, based on the multiple display regions, the multiple display images to obtain a target image; and displaying the target image on the display screen.

Optionally, the converting the multiple regional images into the multiple display images with same resolutions as the resolution of the display screen includes: up-sampling the regional image to obtain the display image with a same resolution as the resolution of the display screen, in a case that a resolution of the regional image is lower than the resolution of the display screen; and/or down-sampling the regional image to obtain the display image with a same resolution as the resolution of the display screen, in a case that a resolution of the regional image is higher than the resolution of the display screen.

A storage medium is further provided according to another embodiment of the present disclosure. The storage medium includes a stored program. When being executed, the program performs the method described above.

A processor is further provided according to another embodiment of the present disclosure. The processor is configured to execute a program. The program, when being executed, performs the method described above.

An image transmission device is further provided according to another aspect of the embodiment of the present disclosure. The image transmission device includes a segmenting unit, an assigning unit and a transmitting unit. The segmenting unit is configured to segment a target image into multiple regions to obtain multiple regional images. The multiple regional images include a first regional image in which a gaze point is located, and a second regional image which is an image in the target image other than the first regional image. The assigning unit is configured to assign resolutions to the multiple regional images. The multiple regional images have different resolutions. The transmitting unit is configured to transmit, one by one, the multiple regional images with different resolutions.

An image display device is further provided according to another aspect of the embodiment of the present disclosure. The image display device includes a receiving unit, a converting unit, a determining unit, a stitching unit and a display unit. The receiving unit is configured to receive, one by one, multiple regional images with different resolutions. The converting unit is configured to convert the multiple regional images with different resolutions into multiple display images with same resolutions as a resolution of a display screen. The determining unit is configured to determine, in the display screen, multiple display regions of the multiple display images. The stitching unit is configured to stitch, based on the multiple display regions, the multiple display images to obtain a target image. The display unit is configured to display the target image on the display screen.

In the embodiments of the present disclosure, the target image is segmented into multiple regions to obtain multiple regional images. Next, resolutions are assigned to respective regional images, and the regional images are rendered based on the assigned resolutions, to obtain multiple regional images with different resolutions. Next, the multiple regional images with different resolutions are transmitted one by one. The target image can be segmented into multiple regional images with different resolutions and then the multiple regional images with different resolutions are transmitted. Compared with a solution in which the target image is directly transmitted at its original resolution, in a case that different resolutions are assigned to the multiple regional images, data amount of the target image is lower than the data amount of the target image with the original resolution. In this way, the data amount of the image to be transmitted can be reduced, a time period for transmitting the image can be shorten, and the image transmission efficiency can be increased in a case that user requirements are satisfied, thereby solving the technical problems in the related technology of a low image transmission efficiency due to the large data amount during full resolution image transmission.

BRIEF DESCRIPTION OF THE DRAWINGS

The drawings described herein are intended to provide a further understanding of the technical solutions and constitute a part of the present resolution. The illustrative embodiments of the present disclosure and the description thereof are intended to explain the technical solutions and are not intended to limit the present disclosure. In the drawings.

DETAILED DESCRIPTION OF EMBODIMENTS

In order to make those skilled in the art better understand the technical solutions of the present disclosure, the technical solutions in the embodiments of the present disclosure are described clearly and completely hereinafter in conjunction with the drawings in the embodiments of the present disclosure. It may be understood that the described embodiments are only some rather than all of the embodiments of the present disclosure. Based on the described embodiments, all other embodiments obtained by those skilled in the art without creative efforts fall within the scope of protection of the present disclosure.

It should be noted that the terms such as "first", "second" and the like in the description, claims and the above drawings are only used to distinguish similar objects, rather than describe a particular or chronological order. It should be understood that data used in the above way may be exchanged in an appropriate case, such that the embodiments of the present disclosure described here can be implemented in an order different from the order shown or described here. It should be noted that the terms such as "include", "comprise" or any other variants thereof are intended to be non-exclusive. For example, a process, method, system, product or device including a series of steps or elements includes not only the steps or elements but also other steps or elements that are not enumerated, or include other steps or elements inherent for the process, method, system, product or device.

An image transmission method is provided according to an embodiment of the present disclosure. It should be noted that steps shown in the flowcharts may be performed by a computer system by executing a set of computer executable instructions. Although a logical order is shown in the flowcharts, the steps shown or described may, in some circumstances, be performed in an order different from that described herein.

Figure 1:
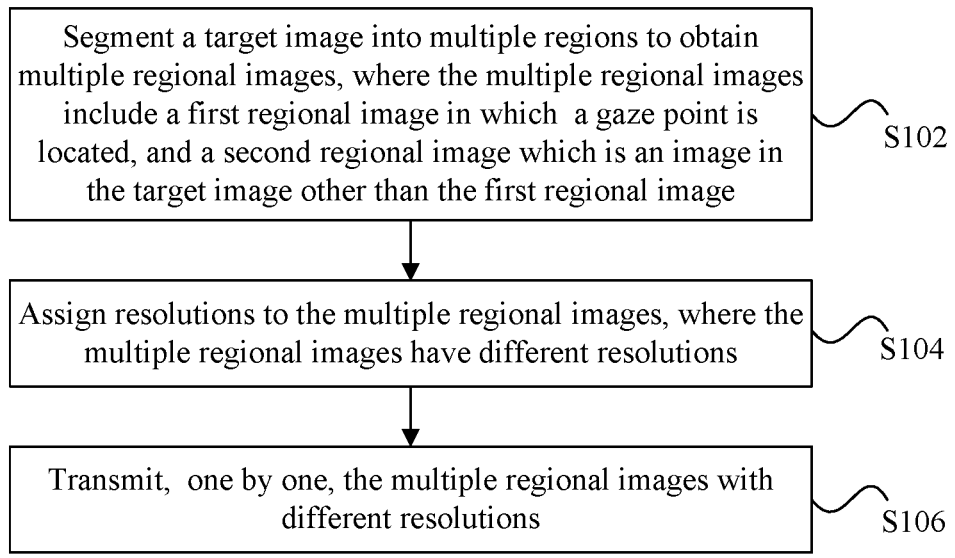
FIG. 1 is a flowchart showing an image transmission method according to an embodiment of the present disclosure.

FIG. 1 is a flowchart showing an image transmission method according to an embodiment of the present disclosure. As shown in FIG. 1, the method includes the following steps S102, S104 and S106.

In step S102, a target image is segmented into multiple regions, so as to obtain multiple regional images. The multiple regional images include a first regional image and a second regional image. The first regional image is an image in which a gaze point is located and the second regional image is an image in the target image other than the first regional image.

In step S104, resolutions are assigned to the multiple regional images. The multiple regional images have different resolutions.

In step S106, the multiple regional images with different resolutions are transmitted one by one.

Through the above steps, the target image is segmented into multiple regions to obtain multiple regional images. Next, resolutions are assigned to respective regional images, and the regional images are rendered based on the assigned resolutions, to obtain multiple regional images with different resolutions. Next, the multiple regional images with different resolutions are transmitted one by one. The target image can be segmented into multiple regional images with different resolutions and then the multiple regional images with different resolutions are transmitted. Compared with a solution in which the target image is directly transmitted at its original resolution, in a case that different resolutions are assigned to the multiple regional images, data amount of the target image is lower than the data amount of the target image with the original resolution. In this way, the data amount of the image to be transmitted can be reduced, a time period for transmitting the image can be shorten, and the image transmission efficiency can be increased in a case that user requirements are satisfied, thereby solving the technical problems in the related technology of a low image transmission efficiency due to the large data amount during full resolution image transmission.

In the technical solutions provided in step S102, the target image may be an image to be transmitted. The target image is segmented into multiple regions. An image represented by each of the multiple regions in the target image is a regional image.

Optionally, the target image may be segmented into multiple target images in a predetermined shape.

As an optional embodiment, in a case that the predetermined shape is circular, multiple concentric circles may be drawn on the target image. In this case, the target image is segmented into a central circle and multiple rings outside the central circle.

As an optional embodiment, in a case that the predetermined shape is rectangular, multiple rectangles may be drawn on the target image. In this case, the target image is segmented into a central rectangle and multiple rectangular rings outside the central rectangle.

In the technical solutions provided in step S104, the image includes multiple pixel points evenly distributed. Different pixel points show different colors, and the multiple pixel points with different colors form an image. The resolution is a parameter used to represent a definition of an image and may be indicated as the number of the pixel points. For example, a resolution of 160×128 represents that there are 160 pixel points in a horizontal direction and 128 pixel points in a vertical direction. Therefore, the resolution of the image may be changed by adjusting the number of the pixel points in the image. Therefore, the higher the resolution of the image is, the larger the number of the pixel points in the image is. The definition of the multiple regional images may be changed by assigning different resolutions to the respective regional images.

It should be noted that the larger the number of pixel points in the image is, the larger data amount of the image is. The data amount may be a data size. For example, a size of an image A is 5 MB, thus the data amount of the image A is 5 Mbytes.

Optionally, resolutions may be assigned to the multiple regional images by rendering.

In the technical solutions provided in step S106, the different resolutions are assigned to the multiple regional images. A regional image with one resolution is transmitted individually, and then a regional image with another resolution is transmitted individually. In this way, the multiple regional images can be transmitted independently, such that accuracy for transmitting the multiple regional images can be ensured.

As an optional embodiment, the process of segmenting the target image into multiple regions to obtain multiple regional images includes: segmenting the target image into a first region and a second region to obtain a first regional image and a regional image. The first region is a region in which the gaze point is located, and the second region is a region in the target image other than the first region.

With the above embodiment of the present disclosure, the target image can be segmented into multiple regions based on the gaze point. In the target image, a region in which the gaze point is located is the first regional image, and a region in which no gaze point is included is the second regional image, such that different resolutions can be assigned to images in different regions based on a visual habit and an actual demand for a user.

It should be noted that the gaze point may be a point which the user views. When the user views the target image, eyes of the user may first focus on a point in the target image. Then the eyes view the target image with the point as a focus. Therefore, the focus from which the user views the image is the gaze point.

Optionally, the target image may be segmented into multiple regions based on the gaze point. A shape of each of the multiple regional images may include but is not limited to a circle, a rectangle or an ellipse.

Optionally, the first regional image may be a key region displayed on the target image, and the second regional image may be a background region of the target image.

Optionally, the gaze point may be located in the center of the first regional image.

Optionally, the second regional image may be arranged around the first regional image.

Optionally, the target image may include multiple second regional images.

Optionally, the multiple second regional images may be arranged around the last regional image sequentially. For example, in a case that the target image is segmented into multiple circular regional images, with the gaze point as a center, the target image is segmented into a circular regional image including the gaze point, and multiple regional images with concentric ring shapes around the circular regional image. The circular regional image in which the gaze point is located is the first regional image, and the multiple ring images outside the circular regional image are the second regional images. A regional image in a first ring is arranged around the first regional image, a regional image in a second ring is arranged around the regional image in the first ring, a regional image in a third ring is arranged around the regional image in the second ring, and so on. In this way, the multiple second regional images with ring shapes can be obtained. It should be noted that, in a case that the target image is rectangular, the outermost second region image may be a rectangular ring, which has an outside edge being a rectangular frame of the target image and a circular inside edge.

As an optional embodiment, the process of assigning the resolutions to the multiple regional images includes: assigning a first resolution to the first regional image, where the first resolution is an original resolution of the target image; and assigning a second resolution to the second regional image, where the second resolution is lower than the original resolution of the target image.

With the above embodiment of the present disclosure, the original resolution of the target image is taken as the first resolution of the first regional image, and the resolution lower than the original resolution of the target image is taken as the resolution of the second regional image. In this way, the definition of the first regional image which the user focuses on can be ensured and the definition of the background regional is reduced. Therefore, the data amount of the target image can be reduced without influencing viewing experience of the user, thereby facilitating the transmitting of the target image.

It should be noted that, when the user views an image (in which different resolutions are not assigned to different regions of the image), the user focuses on contents around the gaze point, and views the background using residual light. That is, when the user views the image, the user views the region near the gaze point clearly, and views the region being away from the gaze point vaguely. Therefore, with this law, in the above embodiment, the higher resolution is assigned to the first regional image, and the lower resolution is assigned to the second regional image. In this way, the data amount of the target image can be reduced by reducing the resolution assigned to the second regional image without influencing the viewing experience of the user for the target image, thereby facilitating the transmitting of the target image.

Optionally, in a case that there are multiple second regional images, the lower resolution is assigned to the regional image being away from the gaze point, and the higher resolution is assigned to the regional image near the gaze point.

As an optional embodiment, in the target image, the first regional image is a circle with the gaze point as a center. The second regional images are multiple concentric rings around the first regional image with the gaze point as a common center. The resolution assigned to the first regional image is the original resolution of the target image. The resolution assigned to the second regional image is lower than the original resolution of the target image. The lower resolution is assigned to the ring farther away from the gaze point.

Optionally, in a case that there are multiple second regional images in the target image, the resolutions assigned to the regional images may be reduced in equal proportion in an ascending order of distances between the regional images and the gaze point. For example, for two adjacent regional images, the resolution assigned to the regional image which is relatively farther from the gaze point is 1/N of the resolution assigned to the regional image which is relatively nearer from the gaze point.

As an optional embodiment, the target image has an original resolution of a. There are multiple second regional images in the target image. The second regional images include, in an ascending order of distances between the regional images and the gaze point, a regional image A and a regional image B. If the resolution is reduced by 50%, the resolution assigned to the first regional image is a, the resolution assigned to the regional image A is 50% a, and the resolution assigned to the regional image B is 50%*50% a=25% a.

As an optional embodiment, the process of assigning the second resolution to the second regional image includes: converting the resolution of the second regional image into the second resolution lower than the original resolution by N-times down-sampling the second regional image.

With the above embodiment of the present disclosure, the second regional image is down-sampled. The resolution of the second regional image is reduced to the second resolution, such that the resolution of the second regional image can be reduced in a case that the display contents of the second regional image remain unchanged.

It should be noted that the image is down-sampled to reduce the resolution and the size of the image, so that the image can be displayed on a display device with a resolution lower than the resolution of the image.

Optionally, in order to down-sample the second regional image, interval sampling may be performed on multiple pixel points in the second regional image via a low-pass filter, so as to obtain the second regional image with the second resolution.

As an optional embodiment, an image with an original size of P*Q is N-times down-sampled, such that a resolution image with a size of (P/N)*(Q/N) can be obtained.

It should be noted that N is a common divisor of P and Q. In a case that an original image is rectangular, an image in an N*N window of the original image is converted into one pixel point, and a value of the pixel point is a mean value of all pixel points in this window.

As an optional embodiment, the process of transmitting, one by one, the multiple regional images with different resolutions includes at least one of: transmitting, one by one, the multiple regional images in a descending order of the resolutions; transmitting, one by one, the multiple regional images in an ascending order of the resolutions; and transmitting, one by one, the multiple regional images in a random order of the resolutions.

With the above embodiment of the present disclosure, multiple regional images with different resolutions are transmitted independently. After a last regional image is transmitted, a next regional image is transmitted. In this way, the multiple regional images can be transmitted independently, thereby ensuring the accuracy for transmitting the multiple regional images.

Figure 2:
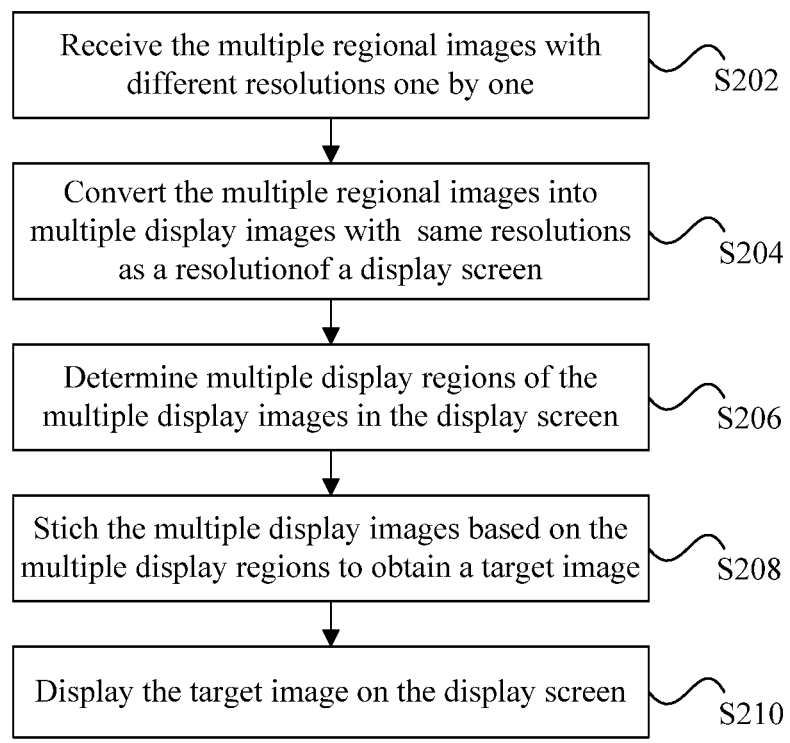
FIG. 2 is a flowchart showing an image display method according to an embodiment of the present disclosure.

FIG. 2 is a flowchart showing an image display method according to an embodiment of the present disclosure. As shown in FIG. 2, the method includes the following steps S202, S204, S206, S208 and S210.

In step S202, multiple regional images with different resolutions are received one by one.

In step S204, the multiple regional images with different resolutions are converted into multiple display images with same resolutions as a resolution of a display screen.

In step S206, multiple display regions of the multiple display images are determined in the display screen.

In step S208, the multiple display images are stitched based on the multiple display regions, to obtain a target image.

In step S210, the target image is displayed on the display screen.

With the above embodiment of the present disclosure, the multiple regional images with different resolutions are received one by one. Next, the multiple regional images with different resolutions are converted into multiple display images, such that the resolutions of the multiple display images are same as the resolution of the display screen. Then multiple display regions of the multiple display images are determined in the display screen, and the multiple display images are stitched based on the multiple display regions, to obtain a complete target image, such that the display screen can completely display the target image.

In step S202, information such as a shape, a size, a resolution as well as pixel data of each of the multiple regional images are included in the multiple received regional images.

In step S204, for each of the multiple received regional images, the regional image is converted based on the resolution information of the regional image, so as to convert the regional image into the display image with a same resolution as the resolution of the display screen.

In step S206, for each of the multiple regional images, after the resolution of the regional image is converted, the display region of the regional image is determined in the display screen based on the shape, location and size of the regional image.

As an optional embodiment, the process of converting the multiple regional images into the multiple display images with same resolutions as the resolution of the display screen includes: up-sampling the regional image to obtain the display image with the same resolution as the resolution of the display screen, in a case that the resolution of the regional image is lower than the resolution of the display screen; and/or down-sampling the regional image to obtain the display image with the same resolution as the resolution of the display screen, in a case that the resolution of the regional image is higher than the resolution of the display screen.

With the above embodiment of the present disclosure, in a case that the resolution of the regional image is lower that the resolution of the display screen, the regional image is up-sampled to increase the resolution of the regional image, so as to obtain the display image with the same resolution as the resolution of the display screen. In a case that the resolution of the regional image is higher that the resolution of the display screen, the regional image is down-sampled to reduce the resolution of the regional image, so as to obtain the display image with the same resolution as the resolution of the display screen. In this way, the resolutions of the regional images are same as the resolution of the display screen, thereby facilitating the display of the regional images on the display screen.

It should be noted that, the image is up-sampled to increase the resolution and the size of the image, so that the image can be displayed on a display device with a resolution higher than the resolution of the image.

Optionally, the up-sampling may be performed by using the interpolation method. That is, a new pixel point is added between pixel points by using a suitable differential algorithm based on the pixels of the original image, to obtain an image with a resolution higher than the original resolution.

Optionally, the up-sampling may be performed as follows. A new pixel point is interpolated between pixel points of the original image, to increase the sampling points. Then interval sampling is performed on all pixel points via the low-pass filter, to obtain an image with a resolution higher than the original resolution.

A preferred embodiment is further provided in the present disclosure. In the preferred embodiment, a regional image transmission method is provided.

The image transmission method and the image display method may be applied in image transmission and image display between a VR device and a computer.

During a process that an image is transmitted between the VR device and the computer, a data transmission amount may be increased in a case that the image is transmitted with its full resolution. However, in an actual application, an image displayed on the VR device is generally an image subjected to rendering.

Optionally, the image displayed on the VR device may be an image subjected to gaze point rendering. In the image, a region around the gaze point displays an image having the same resolution as that of the original image; and other regions display images having the resolutions lower than that of the original image. That is, in the whole display screen, different regional images have different resolutions. Therefore, it is unnecessary to transmit the image with a full resolution during actual transmission.

In the present disclosure, the different regions of the original image are transmitted based on the different resolutions.

The above embodiments of the present disclosure may be applied in a VR system, specifically a VR system of wireless transmission. The VR system of wireless transmission includes an eye-control unit, a computing unit/an image transmitting end (such as a PC or a mobile phone) and a display unit/an image receiving end.

Optionally, the eye-control unit is configured to determine the gaze point of the user.

The regional image transmission method provided in the present disclosure includes the following steps 1 to 6.

In step 1, the gaze point of the user is obtained.

In step 2, a manner for segmenting the image is determined based on the gaze point.

In step 3, different regional images are obtained by using the gaze point rendering technology, where different regional images have different rendering resolutions.

In step 4, the different regional images are transmitted one bay one based on the rendering resolutions of the regional images, until all the regional images are transmitted.

In step 5, after obtaining the regional images, the display device determines a correspondence between pixel points of the regional images and pixel points of the screen.

In step 6, pixel points of all regional images are displayed on the screen.

Optionally, during the process of determining the correspondence between pixel points of the regional images and the pixel points of the screen, for regional images with rendering resolutions lower than the resolution of the screen, full resolutions of the regional images are obtained by using the interpolation method, so that pixel points in the regional images are in one-to-one correspondence with pixel points of the screen.

Optionally, in a case that the manner for segmenting the image is determined based on the gaze point, a shape and a size of a key region as well as a shape and a size of the background region may be determined based on the location of the gaze point.

Optionally, the background region may be n-times down-sampled, and the key region is not sampled. Then locations and sizes of the background region, the key region and other regions are transmitted to a decoding end.

Optionally, the key region may be segmented, and the background of the key region may be m-times down-sampled.

Figure 3:
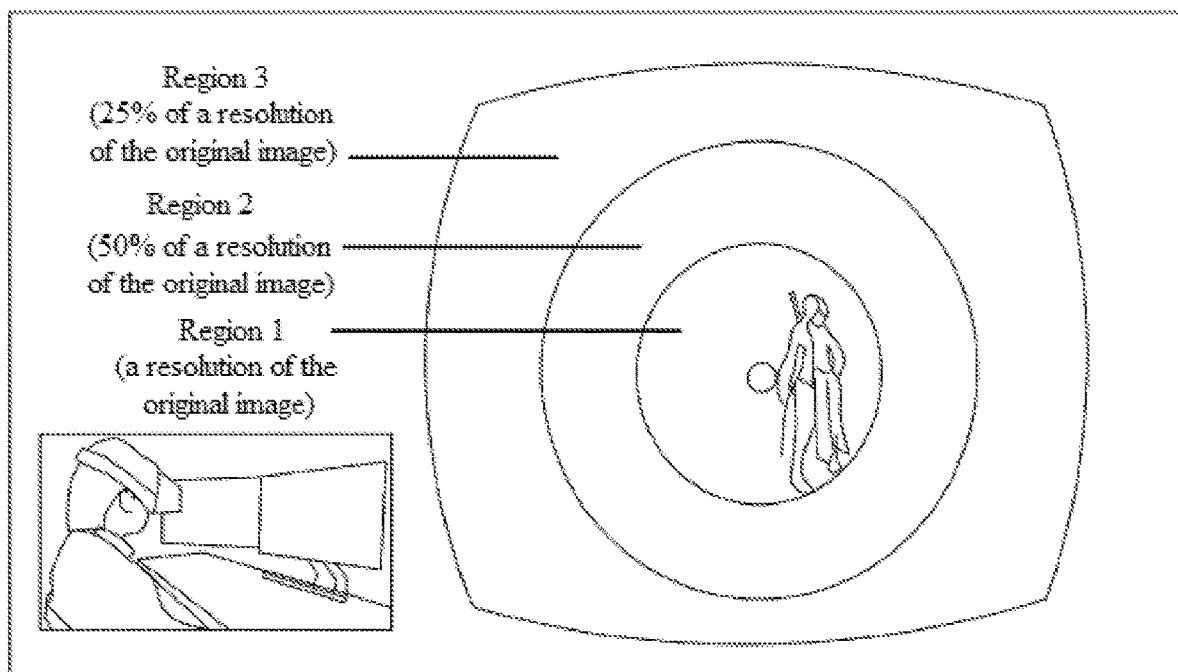
FIG. 3 is a diagram showing an optional method for segmenting an image according to an embodiment of the present disclosure.

FIG. 3 is a diagram showing an optional method for segmenting an image according to an embodiment of the present disclosure. As shown in FIG. 3, a key region is determined, based on a location of a gaze point, as a circle (that is, region 1), and a background region is determined as a region in the image other than the key region. The background region includes a ring region (that is, region 2) and a region (that is, region 3) in the image other than the key region and the ring region. The resolution of the key region is same as that of the original image. The resolution of the ring region in the background region is 50% of that of the original image. The resolution of the region in the background region other than the key region and the ring region is 25% of that of the original image.

In order to achieve the above object, in another aspect of the present disclosure, a storage medium is further provided according to an embodiment of the present disclosure. The storage medium includes a stored program. The program, when being executed, controls a device in which the storage medium is arranged to perform the image transmission method and the image display method.

In order to achieve the above object, in another aspect of the present disclosure, a processer is further provided according to an embodiment of the present disclosure. The processor is configured to execute a program to perform the image transmission method and the image display method.

An image processing device is further provided according to an embodiment of the present disclosure. It should be noted that the image processing device may be configured to perform the image transmission method and the image display method in the embodiments of the present disclosure, that is, the image transmission method and the image display method in the embodiments of the present disclosure may be performed by the image processing device.

Figure 4:
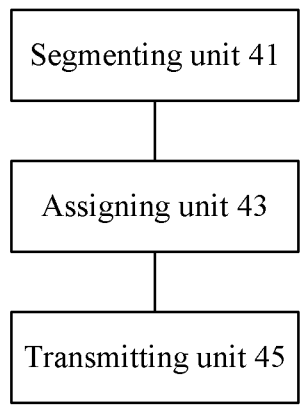
FIG. 4 is a diagram showing an image transmission device according to an embodiment of the present disclosure.

FIG. 4 is a diagram showing an image transmission device according to an embodiment of the present disclosure. As shown in FIG. 4, the image transmission device includes a segmenting unit 41, an assigning unit 43 and a transmitting unit 45. The segmenting unit 41 is configured to segment a target image into multiple regions to obtain multiple regional images. The multiple regional images include a first regional image in which a gaze point is located, and a second regional image which is an image in the target image other than the first regional image. The assigning unit 43 is configured to assign resolutions to the multiple regional images. The multiple regional images have different resolutions. The transmitting unit 45 is configured to transmit, one by one, the multiple regional images with different resolutions.

According to the above embodiment of the present disclosure, the target image is segmented into multiple regions to obtain multiple regional images. Next, resolutions are assigned to respective regional images, and the regional images are rendered based on the assigned resolutions, to obtain multiple regional images with different resolutions. Next, the multiple regional images with different resolutions are transmitted one by one. The target image can be segmented into multiple regional images with different resolutions and then the multiple regional images with different resolutions are transmitted. Compared with a solution in which the target image is directly transmitted at its original resolution, in a case that different resolutions are assigned to the multiple regional images, data amount of the target image is lower than the data amount of the target image with the original resolution. In this way, the data amount of the image to be transmitted can be reduced, and a time period for transmitting the image can be shorten, and the image transmission efficiency can be increased in a case that user requirements are satisfied, thereby solving the technical problems in the related technology of a low image transmission efficiency due to the large data amount during full resolution image transmission.

As an optional embodiment, the assigning unit may include a first assigning module and a second assigning module. The first assigning module is configured to assign a first resolution to the first regional image. The first resolution is the original resolution of the target image. The second assigning module is configured to assign a second resolution to the second regional image. The second resolution is lower than the original resolution of the target image.

As an optional embodiment, the second assigning module includes a first down-sampling module. The first down-sampling module is configured to convert the resolution of the second regional image into the second resolution lower than the original resolution of the image by N-times down-sampling the second regional image.

As an optional embodiment, the transmitting unit may include at least one of a first transmitting module, a second transmitting module and a third transmitting module. The first transmitting module is configured to transmit the multiple regional images in a descending order of the resolutions one by one. The second transmitting module is configured to transmit the multiple regional images in an ascending order of the resolutions one by one. The third transmitting module is configured to transmit the multiple regional images in a random order of the resolutions one by one.

Figure 5:
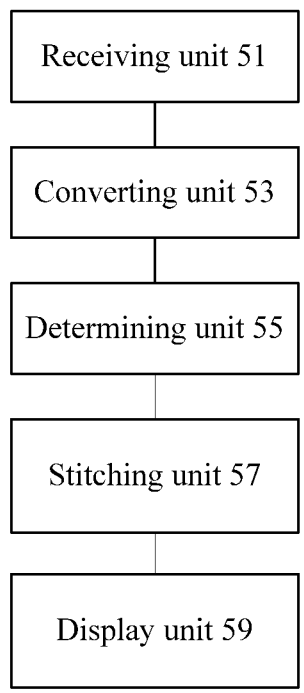
FIG. 5 is a diagram showing an image display device according to an embodiment of the present disclosure.

FIG. 5 is a diagram showing an image display device according to an embodiment of the present disclosure. As shown in FIG. 5, the image display device includes a receiving unit 51, a converting unit 53, a determining unit 55, a stitching unit 57 and a display unit 59. The receiving unit 51 is configured to receive multiple regional images with different resolutions one by one. The converting unit 53 is configured to convert the multiple transmitting images with different resolutions into multiple display images with same resolutions as a resolution of a display screen. The determining unit 55 is configured to determine multiple display regions of the multiple display images in the display screen. The stitching unit 57 is configured to stitch, based on the multiple display regions, the multiple display images to obtain a target image. The display unit 59 is configured to display the target image on the display screen.

With the above embodiment of the present disclosure, the multiple regional images with different resolutions in the target image are received one by one. Next, the multiple regional images with different resolutions are converted into multiple display images, such that the resolutions of the multiple display images are same as the resolution of the display screen. Then multiple display regions of the multiple display images are determined in the display screen, and the multiple display images are stitched based on the multiple display regions, to obtain a complete target image, such that the display screen can completely display the target image.

As an optional embodiment, the converting unit 53 may include an up-sampling module and a second down-sampling module. The up-sampling module is configured to up-sample, in a case that a resolution of a regional image is lower than that of the display screen, the regional image to obtain a display image with a same resolution as that of the display screen. The second down-sampling module is configured to down-sample, in a case that the resolution of a regional image is higher than that of the display screen, the regional image to obtain a display image with a same resolution as that of the display screen.

Sequence numbers of the above embodiments in the present disclosure are only for description and do not represent advantage and disadvantage of the embodiments.

In the above-mentioned embodiments of the present disclosure, different embodiments are described from different angles. For the parts that are not described in detail in one embodiment, one may refer to the related description of another embodiment.

In some embodiments of the present application, it should be understood that the disclosed technical contents may be implemented in other manners. The embodiments for device described above are only schematic. For example, the units may be classified based on logical functions. In actual implementation, the units may be classified in other manners. For example, multiple units or components may be combined or integrated into another system, or some features may be ignored or not executed. Further, the mutual coupling, direct coupling or communication connection shown or discussed may be an indirect coupling or communication connection via some interfaces, units or modules, and may be electrical or have other types.

The units described as separate components may or may not be physically separated. The components shown as units may or may not be physical units, that is, the components may be located in one location, or may be distributed to multiple units. Some or all of the units may be selected based on actual needs to achieve the object of the technical solutions of the embodiment.

In addition, functional units in each embodiment of the present disclosure may be integrated into one processing unit, or the units may be separate physically, or two or more units may be integrated into one unit. The above integrated unit may be implemented in the form of hardware or in the form of a software functional unit.

In a case that the integrated unit is implemented in the form of a software functional unit and is sold or used as an independent product, the integrated unit may be stored in a computer readable storage medium. Based on such understanding, the essence of the technical solutions of the present disclosure, or parts of the technical solutions which contribute to the related art, or all or parts of the technical solutions may be embodied in the form of a software product stored in a storage medium. A number of instructions are included to cause a computer device (such as a personal computer, a server or a network device) to perform all or parts of the steps of the methods described in embodiments of the present disclosure. The above-mentioned storage medium may include a U disk, a read-only memory (ROM), a random access memory (RAM), a removable hard disk, a magnetic disk, an optical disk or media which can store program codes.

Only preferred embodiments of the present disclosure are described above. It should be noted that for those skilled in the art, various improvements and modifications can be made without departing from the principle of the present disclosure, and these improvements and modifications should fall within the scope of protection of the present disclosure.

The invention claimed is:

1. An image transmission method, comprising:
   segmenting a target image into a plurality of regions to obtain a plurality of regional images, wherein the plurality of regional images comprises a first regional image in which a gaze point is located, and a second regional image which is an image in the target image other than the first regional image;
   assigning resolutions to the plurality of regional images, wherein the plurality of regional images have different resolutions; and
   transmitting, one by one, the plurality of regional images with different resolutions.

2. The method according to claim 1, wherein the assigning the resolutions to the plurality of regional images comprises:
   assigning a first resolution to the first regional image, wherein the first resolution is an original resolution of the target image; and
   assigning a second resolution to the second regional image, wherein the second resolution is lower than the original resolution of the target image.

3. The method according to claim 2, wherein the assigning the second resolution to the second regional image comprises:
   converting a resolution of the second regional image into the second resolution lower than the original resolution by down-sampling the second regional image.

4. The method according to claim 1, wherein the transmitting, one by one, the plurality of regional images with different resolutions comprises at least one of:
   transmitting, one by one, the plurality of regional images in a descending order of the resolutions;
   transmitting, one by one, the plurality of regional images in an ascending order of the resolutions; and
   transmitting, one by one, the plurality of regional images in a random order of the resolutions.

5. A storage medium, comprising a stored program, wherein the program, when being executed, controls a device in which the storage medium is arranged to perform the image transmission method according to claim 1.

6. The storage medium according to claim 5, wherein the assigning the resolutions to the plurality of regional images comprises:
   assigning a first resolution to the first regional image, wherein the first resolution is an original resolution of the target image; and
   assigning a second resolution to the second regional image, wherein the second resolution is lower than the original resolution of the target image.

7. The storage medium according to claim 6, wherein the assigning the second resolution to the second regional image comprises:
   converting a resolution of the second regional image into the second resolution lower than the original resolution by down-sampling the second regional image.

8. The storage medium according to claim 5, wherein the transmitting, one by one, the plurality of regional images with different resolutions comprises at least one of:
   transmitting, one by one, the plurality of regional images in a descending order of the resolutions;
   transmitting, one by one, the plurality of regional images in an ascending order of the resolutions; and
   transmitting, one by one, the plurality of regional images in a random order of the resolutions.

9. A processor, wherein the processor is configured to execute a program, and the program, when being executed, performs the image transmission method according to claim 1.

10. The processor according to claim 9, wherein the assigning the resolutions to the plurality of regional images comprises:
    assigning a first resolution to the first regional image, wherein the first resolution is an original resolution of the target image; and
    assigning a second resolution to the second regional image, wherein the second resolution is lower than the original resolution of the target image.

11. The processor according to claim 10, wherein the assigning the second resolution to the second regional image comprises:
    converting a resolution of the second regional image into the second resolution lower than the original resolution by down-sampling the second regional image.

12. The processor according to claim 9, wherein the transmitting, one by one, the plurality of regional images with different resolutions comprises at least one of:
    transmitting, one by one, the plurality of regional images in a descending order of the resolutions;
    transmitting, one by one, the plurality of regional images in an ascending order of the resolutions; and
    transmitting, one by one, the plurality of regional images in a random order of the resolutions.

13. An image transmission device, comprising:
    a segmenting unit configured to segment a target image into a plurality of regions to obtain a plurality of regional images, wherein the plurality of regional images comprises a first regional image in which a gaze point is located, and a second regional image which is an image in the target image other than the first regional image;
    an assigning unit configured to assign resolutions to the plurality of regional images, wherein the plurality of regional images have different resolutions; and
    a transmitting unit configured to transmit, one by one, the plurality of regional images with different resolutions.

14. An image display method, comprising:
    receiving, one by one, a plurality of regional images with different resolutions;
    converting the plurality of regional images with different resolutions into a plurality of display images with same resolutions as a resolution of a display screen;
    determining, in the display screen, a plurality of display regions of the plurality of display images;
    stitching, based on the plurality of display regions, the plurality of display images to obtain a target image; and
    displaying the target image on the display screen.

15. The method according to claim 14, wherein the converting the plurality of regional images into the plurality of display images with same resolutions as the resolution of the display screen comprises:
- up-sampling the regional image to obtain the display image with a same resolution as the resolution of the display screen, in a case that a resolution of the regional image is lower than the resolution of the display screen; and/or
- down-sampling the regional image to obtain the display image with a same resolution as the resolution of the display screen, in a case that a resolution of the regional image is higher than the resolution of the display screen.

16. An image display device for implementing the image display method according to claim 14, comprising:
- a receiving unit configured to receive, one by one, a plurality of regional images with different resolutions;
- a converting unit configured to convert the plurality of regional images with different resolutions into a plurality of display images with same resolutions as a resolution of a display screen;
- a determining unit configured to determine, in the display screen, a plurality of display regions of the plurality of display images;
- a stitching unit configured to stitch, based on the plurality of display regions, the plurality of display images to obtain a target image; and
- a display unit configured to display the target image on the display screen.

17. A storage medium, comprising a stored program, wherein the program, when being executed, controls a device in which the storage medium is arranged to perform the image display method according to claim 14.

18. The storage medium according to claim 17, wherein the converting the plurality of regional images into the plurality of display images with same resolutions as the resolution of the display screen comprises:
- up-sampling the regional image to obtain the display image with a same resolution as the resolution of the display screen, in a case that a resolution of the regional image is lower than the resolution of the display screen; and/or
- down-sampling the regional image to obtain the display image with a same resolution as the resolution of the display screen, in a case that a resolution of the regional image is higher than the resolution of the display screen.

19. A processor, wherein the processor is configured to execute a program, and the program, when being executed, performs the image display method according to claim 14.

20. The processor according to claim 19, wherein the converting the plurality of regional images into the plurality of display images with same resolutions as the resolution of the display screen comprises:
- up-sampling the regional image to obtain the display image with a same resolution as the resolution of the display screen, in a case that a resolution of the regional image is lower than the resolution of the display screen; and/or
- down-sampling the regional image to obtain the display image with a same resolution as the resolution of the display screen, in a case that a resolution of the regional image is higher than the resolution of the display screen.

* * * * *